UPGRADING AGRICULTURAL SPRAY OIL

Richard E. Ware, Trainer, and Lewis W. Hall, Jr., Chadds Ford, Pa., assignors to Sun Research and Development Co., Philadelphia, Pa.
No Drawing. Filed Aug. 24, 1972, Ser. No. 283,461
Int. Cl. C10g 29/22
U.S. Cl. 208—297 R       2 Claims

ABSTRACT OF THE DISCLOSURE

A process for raising the unsulfonatable residue and decreasing the ultraviolet light absorption of a solvent refined paraffinic oil thereby making it suitable as a high quality agricultural spray oil, by contacting said oil with a relatively small amount of bauxite.

---

Specifications for high quality agricultural spray oils require that they have high unsulfonatable residues (over 96 volume percent) in order that potential damage to vegetation is minimized and to enhance pesticidal activity of the oil. In addition, it is desirable that the spray oil meet FDA specifications for technical white oil with respect to ultraviolet absorbance; e.g., the oil must have an absorbance not exceeding (a) 4.0 per centimeter optical path at wave length of 280–289 m$\mu$, (b) 3.3 at 290–299 m$\mu$, (c) 2.3 at 300–329 m$\mu$, and (d) 0.8 at 330–350 m$\mu$, in accord with FDA 121.2589(b).

Solvent refined paraffinic oils contain an unsulfonatable residue (hereinafter called UR) which varies from about 92 to 94 volume percent and although useful in some agricultural spray oil applications, they do not have the high quality specifications referred to above. Hydrogenation of these oils of 92 to 94% UR does raise the UR to 95% or higher (e.g., about 97%) and by hydrogenating under moderately severe conditions the ultraviolet absorbance is also reduced to acceptable levels. Thus, for example, U.S. 3,673,078 (M. C. Kirk, Jr., assigned to Sun Oil Company, issued June 27, 1972) refers to the process of Mills and Dimeler (Ser. No. 850,717, abandoned and refiled as Ser. No. 228,832) which discloses a process for producing a technical white oil having an ultraviolet absorptivity in the 280–289 millimicron region less than 2.0 and having a viscosity in the range of 300–600 SUS at 100° F., said process comprising hydrogenating a paraffinic distillate having a viscosity in the range of 300–600 SUS at a temperature in the range of 550–600° F., at a hydrogen partial pressure in the range of 800–3000 p.s.i. and a total pressure in the range of 800–6000 p.s.i.g., in the presence of a hydrogenation catalyst comprising sulfides of nickel and molybdenum, and at a liquid hourly space velocity in the range of 0.1–1.0. The application also discloses a process for producing a technical white oil having an ultraviolet absorptivity in the 280–289 millimicron region less than 1.5 and having a viscosity in the range of 50–300 SUS at 100° F., said process comprising hydrogenating a paraffinic distillate having a viscosity in the range of 50–300 SUS at a temperature in the range of 565–640° F., at a hydrogen partial pressure in the range of 800–3000 p.s.i. and a total pressure in the range of 800–6000 p.s.i.g., in the presence of a hydrogenation catalyst comprising sulfides of nickel and molybdenum, and at a liquid hourly space velocity in the range of 0.1–1.0. However, in plant practice it is frequently the case that, for one or more reasons, operating parameters are not met or not maintained and the resultant oil product does not meet the desired specification with respect to ultraviolet absorbance. The process of this invention makes it possible to upgrade such off-specification material by a simple, inexpensive procedure.

In accord with this invention, a solvent refined agricultural spray oil having a UR of about 95% to about 97% and an ultraviolet absorbance greater than that required by FDA specification 121.2589(b) is upgraded by treating such oil with relatively small amounts of bauxite. The success of such a procedure is particularly surprising since generally large amounts of adsorbents have been required for color reduction of certain petroleum products. Thus, U.S. 3,369,993 (I. W. Mills et al., issued Feb. 20, 1968, assigned to Sun Oil Company) discloses that color may be removed from deoiled waxes by contact with numerous absorbents (clays, activated carbon, bauxite, silicates, etc.) at a relatively high level of 100 to 200 pounds per 300 pound barrel of wax. It is also significant that contacting of an agricultural spray oil with attapulgus clay, a montmorillonite clay, or silica gel is not effective in raising the ultraviolet absorbance to the required specification.

In accord with this invention, a solvent refined paraffinic oil of about 95% to about 97% UR and having an ultraviolet absorbance (a) above 4.0 per centimeter optical path at a wave length of 280–289 m$\mu$, (b) above 3.3 at 290–299 m$\mu$, (c) above 2.3 at 300–329 m$\mu$, and (d) above 0.8 at 330–350 m$\mu$ is upgraded by contacting said oil with bauxite having a particle size of from about 20 to 60 mesh (U.S. Sieve Series) and in an amount of from about 5 to about 50 pounds per barrel of oil treated, whereby a high quality agricultural spray oil is obtained which has an unsulfonated residue greater than 96% and an ultraviolet light absorbance meeting FDA specification 121.2589(b).

The hydrocarbon oils useful in the process of the invention will be solvent refined fractions of petroleum oil composed primarily of paraffinic with some naphthenic hydrocarbons containing less than 10 wt. percent aromatics. The oils as herein described are referred to as agricultural crop spray oils and will have the following approximate physical properties:

| | |
|---|---|
| Gravity, °API/60° F. | 33.5 |
| Viscosity, SUS/100° F. | 60–120 |
| Viscosity, SUS/210° F. | 34–40 |
| Flash point, °F. | 300–400 |
| Pour temperature, °F., max. | +20 |
| Unsulfonated residue, vol. percent (ASTM) | 92–94 |
| Refractive index, 25° C. | 1.4660–1.4690 |
| Gel aromatics, wt. percent, max. | 10.0 |
| Distillation range at 10 mm. Hg (ATSM D-1160), °F. | 100 |

In accord with invention, the oil to be upgraded is subjected to treatment with bauxite, preferably by percolation through a bed of the material. The amount of bauxite used in the process may be as low as about 5 lbs./bbl., but, in general, from about 5 to about 50 lbs./bbl. will be used, preferably from about 5 to about 40 lbs./bbl. The bauxite must be of from about 20 to about 60 mesh material (U.S. Sieve Series), since a bauxite outside this range causes a significant loss in process efficiency. For example, if the particle size is larger than about 20, more than about 50 lbs./bbl. must be used to meet the FDA specification. On the other hand, if a particle size smaller than about 60 is used a serious problem with the passing through of fines results. Thus, a 20 to 60 mesh material is needed in the process. Temperature of contacting is not critical, but will usually be between about 20° C. and 95° C., preferably about 25° to 75° C. Likewise, contact time is not a critical parameter, but contact between the bauxite and the oil will generally be maintained for at least about 0.5 hour and preferably at least about 1 hour. A longer contact time contributes little to the process. In a refinery operation a preferred technique will consist of parallel percolating units with a throughput of about 1500 bbl./day, each bed of the percolating unit employing about 100 tons of bauxite. Each unit will be on stream about ten days and the percolating stream then switched to an alternate unit. The spent bauxite is readily recovered, cleaned by steaming, and reused. Thus, by treatment in accord with the process of the invention, the agricultural spray oil obtained is of exceedingly high quality, meeting the specifications discussed above.

The following examples are given to further illustrate the process:

EXAMPLE 1

A solvent refined 70 second agricultural spray oil having a UR of about 94 which had been subjected to a mild hydrogenation was thereby improved to a UR of 95.5 but the treated oil still did not meet FDA 121.2589(b). The improved oil was contacted at 75° C. with 20 to 60 mesh bauxite ("Porocel," Englehard Minerals and Chemicals Corp.) in an amount of 20 lbs. per barrel of oil and contact maintained for three hours. The properties of the oil used were as follows.

Oil characteristics:
| | |
|---|---|
| Viscosity, SUS at 100° F. | 70 |
| Viscosity, SUS at 210° F. | 36.3 |
| API gravity at 60° F. | 35.5 |
| Specific gravity at 60° F. | 0.8473 |
| Density, $4^{20}$ | 0.8436 |
| Weight, lb./gal. | 7.055 |
| Flash point, COC, ° F. | 360 |
| Volatility, 22 hours at 225° F., wt. percent | 3.20 |
| Pour point, ° F. | −5 |
| Color, ASTM D-1500 | L0.5 |
| UV absorptivity at 260 m$\mu$ | 0.41 |
| Molecular weight | 320 |
| Viscosity-gravity constant | 0.806 |
| Refractive index, $_D^{20}$ | 1.4664 |
| Refractivity intercept | 1.0444 |
| Carbon type analysis— | |
| Aromatic carbon atoms, $C_A$, percent | 2 |
| Naphthenic carbon atoms, $C_N$, percent | 32 |
| Paraffinic carbon atoms, $C_P$, percent | 66 |
| Molecular type analysis (clay-gel)— | |
| Asphaltenes, wt. percent | 0.0 |
| Polar compounds, wt. percent | 0.2 |
| Aromatics, wt. percent | 7.9 |
| Saturates, wt. percent | 91.9 |
| Aniline point, ° F. | 210 |
| ASTM D-2226 type | 104B |

The following table indicates the results of the bauxite contacting:

| | Maximum absorbance per cm. optical path | | | | |
|---|---|---|---|---|---|
| Wave length, m$\mu$ | 280/289 | 290/299 | 300/329 | 330/350 | UR percent |
| Specifications [1] | 4.0 | 3.3 | 2.3 | 0.8 | |
| Prior to hydrogenation | 52.0 | 41.0 | 33.0 | 9.8 | 94.0 |
| Hydrogenated product | 6.5 | 4.3 | 3.2 | 1.6 | 95.5 |
| After bauxite treatment | 3.6 | 2.3 | 1.8 | 0.7 | 96.5 |

[1] FDA 121.2589(b).

It is clear from the above data that the bauxite contacting upgraded the oil to the desired FDA specifications.

EXAMPLE 2

A 70 second spray oil of about 96.5 UR but not meeting FDA 121.1589(b) was subjected to contacting at 25° C. with 29 lbs. per barrel of several agents known to improve oil color. The data is shown in the following table:

| | Maximum absorbance per cm. optical path | | | |
|---|---|---|---|---|
| Wave length, m$\mu$ | 280/289 | 290/299 | 300/329 | 330/350 |
| Specifications | 4.0 | 3.3 | 2.3 | 0.8 |
| Oil before treatment | 6.5 | 4.3 | 3.2 | 1.6 |
| After treatment with: | | | | |
| Silica gel (20–200 mesh) | 3.8 | 2.4 | 2.0 | 1.0 |
| Attapulgus clay | 4.5 | 3.0 | 2.1 | 1.1 |
| Montmorillonite | 4.9 | 3.1 | 2.2 | 1.1 |

It is clear from the above data that the attapulgus clay and montmorillonite treatments were ineffective in achieving the required absorbance specification at 280–280 m$\mu$ and at 330–350 m$\mu$ and, likewise, the silica gel treatment was ineffective at 330–350 m$\mu$.

The invention claimed is:

1. A process for upgrading a solvent refined paraffinic oil which has an unsulfonatable residue of from about 95% to about 97% and an ultraviolet absorption (a) above 4.0 per centimeter optical path at a wave length of 280–289 m$\mu$, (b) above 3.3 at 290–299 m$\mu$, (c) above 2.3 at 300–329 m$\mu$, and (d) above 0.8 at 330–350 m$\mu$, which comprises contacting said oil with bauxite of a particle size between about 20 and about 60 mesh in an amount of from about 5 to about 50 pounds per barrel of oil treated, whereby a high quality agricultural spray oil is obtained having an ultraviolet light absorbance not exceeding (a) 4.0 per centimeter optical path at a wave length of 280–289 m$\mu$, (b) 3.3 at 290–299 m$\mu$, (c) 2.3 at 300–329 m$\mu$ and (d) 0.8 at 330–350 m$\mu$.

2. A process as in claim 1 where the amount of bauxite is from about 5 to 40 pounds per barrel of oil.

References Cited

UNITED STATES PATENTS

| | | | |
|---|---|---|---|
| 2,390,917 | 12/1945 | Breth et al. | 208—297 |
| 2,596,942 | 5/1952 | Robertson et al. | 208—297 |
| 2,170,628 | 8/1939 | Breth et al. | 208—297 |
| 2,446,489 | 8/1948 | Schaafsma | 208—297 |
| 3,673,078 | 6/1972 | Kirk | 208—89 |

DELBERT E. GANTZ, Primary Examiner

J. M. NELSON, Assistant Examiner